United States Patent
Hulsebos et al.

(10) Patent No.: US 6,533,331 B2
(45) Date of Patent: Mar. 18, 2003

(54) COUPLING DEVICE AND METHOD FOR FABRICATING A GRIP RING TO BE USED IN SUCH A COUPLING DEVICE

(75) Inventors: Michel Paul Hulsebos, Deventer (NL); Dries Nijsen, Enschede (NL)

(73) Assignee: Georg Fischer Waga N.V., Epe (NL)

( * ) Notice: Subject to any disclaimer, the term of this patent is extended or adjusted under 35 U.S.C. 154(b) by 0 days.

(21) Appl. No.: 09/818,973

(22) Filed: Mar. 27, 2001

(65) Prior Publication Data

US 2001/0030421 A1 Oct. 18, 2001

Related U.S. Application Data

(63) Continuation-in-part of application No. 08/790,146, filed on Jan. 28, 1997, now Pat. No. 6,257,628, and a continuation-in-part of application No. 09/360,983, filed on Jul. 26, 1999, now Pat. No. 6,279,963.

(30) Foreign Application Priority Data

| Mar. 4, 1996 | (NL) | ............................................. 1002514 |
| Jul. 24, 1998 | (NL) | ............................................. 1009734 |
| Mar. 27, 2000 | (NL) | ............................................. 1014758 |

(51) Int. Cl.$^7$ ................................................. F16L 21/06
(52) U.S. Cl. ........................ 285/323; 285/328; 285/339
(58) Field of Search ................................ 285/328, 104, 285/327, 339, 369, 323

(56) References Cited

U.S. PATENT DOCUMENTS

| 2,434,484 A | * | 1/1948 | Chambers .................... 277/553 |
| 2,989,326 A | * | 6/1961 | Seward et al. ............... 285/339 |
| 5,067,751 A | * | 11/1991 | Walworth et al. ........... 285/105 |
| 5,297,826 A | * | 3/1994 | Percebois et al. ........... 285/339 |

* cited by examiner

Primary Examiner—Lynne H. Browne
Assistant Examiner—Aaron M Dunwoody
(74) Attorney, Agent, or Firm—Darby & Darby

(57) ABSTRACT

A coupling device for a pipe having a sleeve with an insert end for the pipe and a sealing means suitable for realizing a seal around the pipe inserted in the sleeve having a plurality of mutually slidable elements which together form a ring, and a grip ring mounted within said elements and extending along at least a part of the circumference of the pipe. The grip ring has projections that extend substantially radially inwards from its surface.

8 Claims, 2 Drawing Sheets

COUPLING DEVICE AND METHOD FOR FABRICATING A GRIP RING TO BE USED IN SUCH A COUPLING DEVICE

This is a continuation-in-part of Ser. No. 08/790,146, filed Jan. 28, 1997, now U.S. Pat. No. 6,257,628, issued Jul. 10, 2001, and Ser. No. 09/360,983, filed Jul. 26, 1999, now U.S. Pat. No. 6,279,963, issued Aug. 28, 2001, which are incorporated by reference in their entirety.

BACKGROUND OF THE INVENTION

The present invention relates to a coupling device for a pipe, comprising a sleeve having an insert and for the pipe and sealing means suitable for realizing a seal around the pipe inserted in the sleeve, said sealing means comprising a plurality of mutually slidable elements which together form a ring, and a grip ring being mounted inside said elements and extending along at least a part of the circumference of the pipe.

Such a coupling device is disclosed in the European patent application EP-A-0 794 378, corresponding to U.S. Ser. No. 08/790,146, which has been incorporated by reference herein, and assigned to the present applicant. The coupling device is used for pipes made of steel, stainless steel, eternite, cast-iron, coated steel, PVC, polyethylene and asbestos cement, and is used for coupling two such pipes. It is of importance that on the one hand the coupling device provides an adequate seal and that on the other hand said coupling device is able to withstand tensile strain. This latter function is provided by the grip ring that is part of the coupling device.

From the Dutch patent application 1009734 to applicant, corresponding to U.S. Ser. No. 09/360,983, which has been incorporated by reference herein, a grip ring is known embodied with projections that are pressed out of the surface of the grip ring. At one side the projections then are delimited by slit-like openings punched out of the grip ring. While this grip ring is effective on pipes made of harder material, when using it on pipes that are made of a softer material, it seems to have the effect of a cheese slicer, with the result that the tensile strength of the coupling device is accordingly relatively limited. When such a coupling device is used with such softer materials as polyethylene, polybutene, acryl butadiene styrene, or polypropylene, a tensile strain of approximately 6 to 7 bars may apply in the large diameters, and in the smaller diameters this may be 15 to 16 bars. It would thus be desirable to provide a grip ring permitting higher tensile values.

SUMMARY OF THE INVENTION

It is the objective of the invention to provide a grip ring such having improved tensile values. In accordance with the invention, this is achieved by embodying the grip ring with projections that extend substantially radially inwards from the surface of the grip ring. It has been shown that when the coupling device according to the invention is applied to such a pipe made of relatively soft material and having a diameter of 200 mm, for example, it tolerates a tensile strain of 25 to 30 bars, as compared to 6 to 7 bars.

Preferably, the projections are pressed out of the surface of the grip ring and formed such that over a first distance in the circumferential direction of the grip ring said projections have rims delimiting said projections and extending inwardly, while over a second distance, which second distance is smaller than the first distance, having a portion extending inwardly between said rims. This provides a set of substantially symmetrically formed projections with the result that the grip characteristic is invariant with regard to the direction of any possible rotational strain the pipe may exert on the coupling device.

In a further aspect of the invention, the grip ring is equipped with projections having a double wedge shape, the two wedge shaped portions being positioned in each other's extended direction with their low sides abutting. In accordance with the form thus conferred on the projections, they substantially follow the periphery of the pipe to be clamped, while also providing a relatively large contact surface with which the projections clamp the pipe. The height of the projections necessary may be a mere 1 mm maximally, so that the depth of penetration into the pipe is kept very much to a limit. Moreover, it is a "restricted" penetration; the projections do not make an undesirable radial notch in the pipe.

The clamping action of the coupling device according to the invention is furthered especially by holes provided on the grip rings, said holes in longitudinal direction being delimited on either side by the projections.

The invention is also embodied in a method for the fabrication of a grip ring suitable to be used in a coupling device according to the invention, characterized in that angular holes are punched into a plate, and in that subsequently directly adjacent, at either side of the holes, the rims delimiting the holes are bent, followed by shaping the plate into at least a partial ring form.

BRIEF DESCRIPTION OF THE DRAWINGS

Other objects, features and advantages of the invention discussed in the above summary of the invention will be more clearly understood when taken together with the following detailed description of the embodiments which will be understood as being illustrative only, and the accompanying drawings reflecting aspects of those embodiments, in which.

Similar parts in the figures carry the same reference numbers.

DETAILED DESCRIPTION

Figure 1:
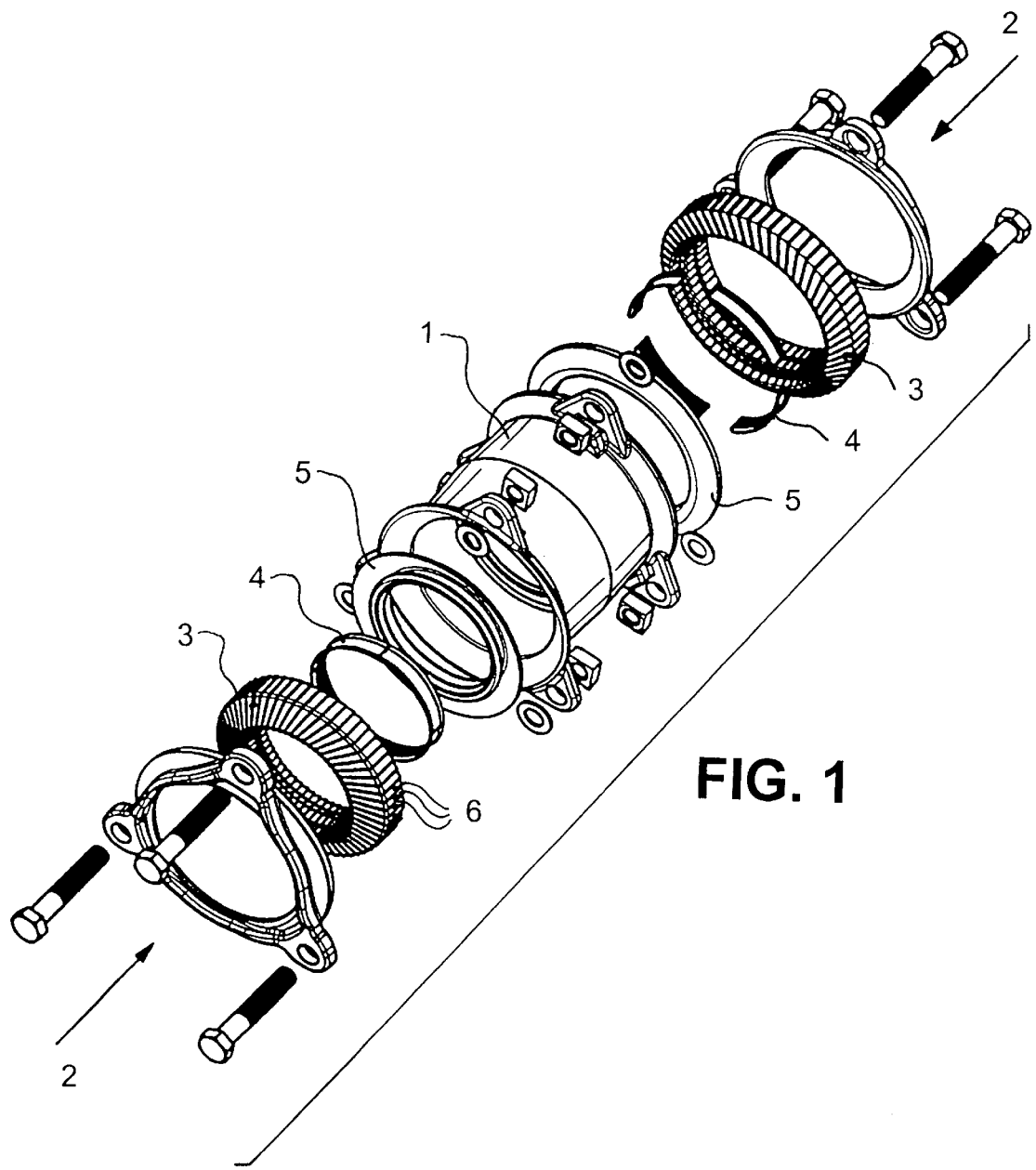
In FIG. 1 shows an exploded view of the coupling device according to the invention; and In FIG. 2 shows a partial view in perspective of the grip ring, which is part of the coupling device according to the invention.

Referring first to FIG. 1, the coupling device is shown in an exploded view and comprises a sleeve 1 having an insert end 2 for a pipe which is not shown, and a sealing means 3, 4, 5 suitable for realizing a seal around the pipe inserted in the sleeve 1, said sealing means 3, 4, 5 comprising a plurality of mutually slidable elements 6 which together form a ring 3, and a grip ring 4 being mounted in said elements 6 and extending along at least a part of the circumference of the pipe, said grip ring 4 being formed with projections pressed out of the surface of the grip ring, and extending substantially radially inwards. For a further description of the coupling device reference is made to EP-A-0 794 378 and U.S. Ser. No. 08/790,146, which has been incorporated by reference herein.

Figure 2:
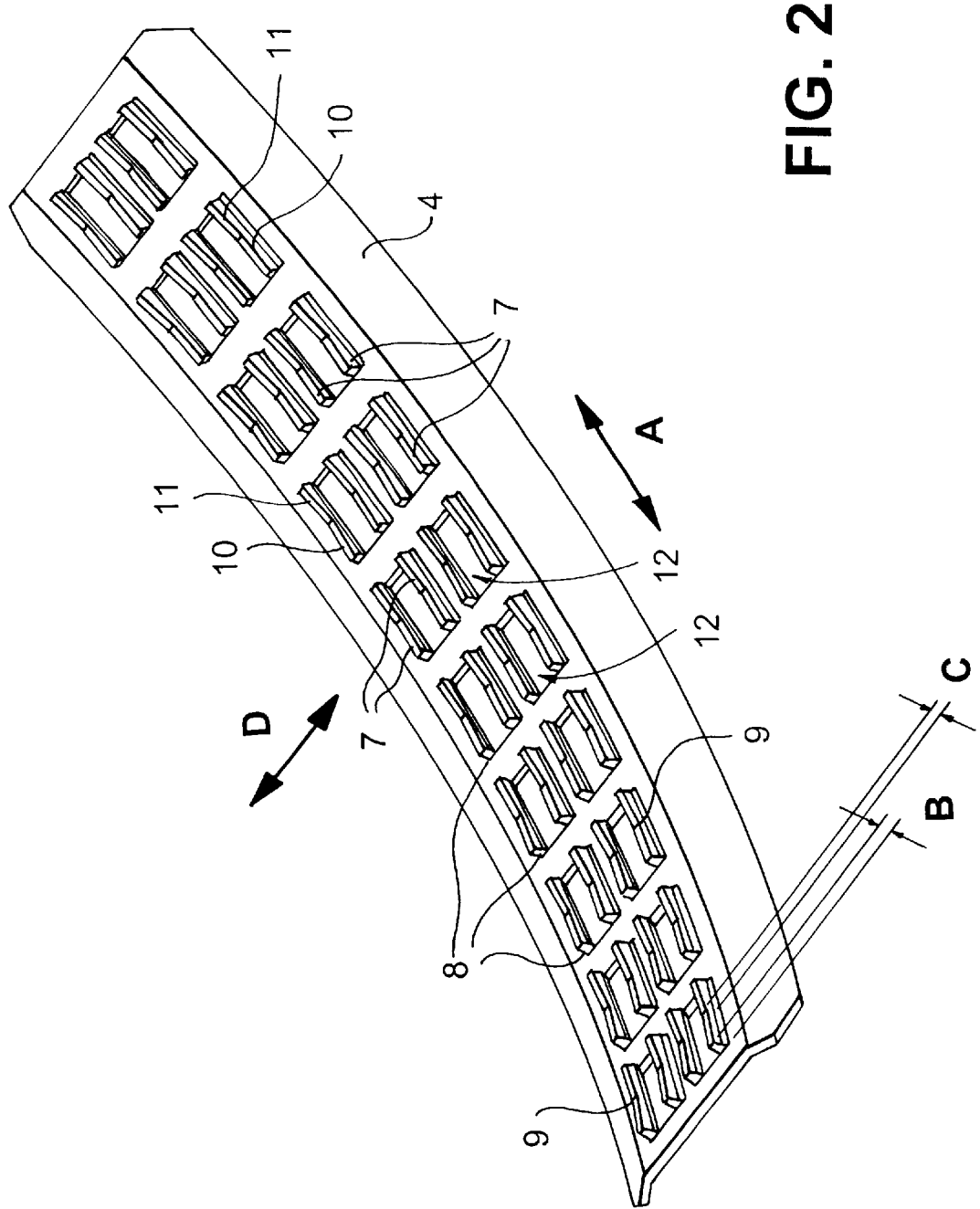

With reference to FIG. 2, the embodiment of the grip ring 4 is further elucidated. As already mentioned, the grip ring 4 is embodied with projections 7 pressed out of the surface of the grip ring and extending substantially radially inwards. As clearly shown in FIG. 2, the projections 7 are pressed out of the surface of the grip ring 4 and are formed such that, viewed in the circumferential direction of the grip ring indicated with arrow A, each projection has rims 8 extending inwardly over a first distance B and delimiting said projections 7, and has a portion 9 positioned between said rims 8 and extending inwardly over a second distance C, the second distance C being smaller than the first distance B. More specifically and preferably as shown in FIG. 2, the projections 7 are embodied with a double wedge shape such that the two wedge shaped portions 10 and 11 are positioned in each other's extended direction and their lower sides abut in the portion 9 between the rims 8. FIG. 2 also clearly shows that the grip ring 4 is provided with holes 12, which holes 12 in the longitudinal direction indicated with arrow D, are delimited at either side of the projections 7. The grip ring may be fabricated from various materials. Preferably, however, the grip ring 4 is made of stainless spring steel having a tensile strength of at least 1200 N/mm$^2$ and preferably ranging approximately 1400 to 1600 N/mm$^2$. However, the grip ring is already fully effective when it has the above-mentioned tensile strength of 1200 N/mm$^2$. According to the invention, the grip ring 4 is preferably fabricated such that angular holes 8 are punched in preferably a stainless steel plate, strip or band, and that subsequently directly adjacent the holes at either side, the rims delimiting the holes are bent, which bent rims then serve as the above-described projections of the grip rim 4. The plate is then shaped into a ring, which is adjusted to the diameter of the coupling device in which it is used.

What is claimed is:

1. A pipe coupling device comprising a sleeve having an insert end, a sealing means for providing a seal around a pipe inserted into the insert end comprising a plurality of elements mutually slidable relative to one another which together form a ring, and a grip ring mounted within said elements and extending along at least a part of the circumference of the pipe, the grip ring having projections that extend substantially radially inwards from the radially inward surface of the grip ring.

2. The pipe coupling device according to claim 1, wherein the projections have rims extending inwardly a first distance delimiting the projections in the circumferential direction and a portion between said rims extending inwardly a second distance, the second distance being smaller that the first distance.

3. The pipe coupling device according to claim 2, wherein the portion between the rims includes first and second wedge-shaped portions positioned with their low sides abutting.

4. The pipe coupling device according to claim 1, wherein the grip ring has holes delimited in the longitudinal direction on either side by the projections.

5. A method of fabricating the grip ring of claim 2, comprising punching angular holes into a plate, bending the rims directly adjacent thereto at either side, and shaping the plate into at least a partial ring.

6. The pipe coupling device of claim 1, wherein the projections extend radially inward no more than about 1 mm.

7. The pipe coupling device of claim 1, wherein the grip ring is comprised of spring steel having a tensile strength of at least about 1200 N/mm$^2$.

8. The pipe coupling device of claim 7, wherein the grip ring has a tensile strength of about 1400 to about 1600 N/mm$^2$.

* * * * *